United States Patent [19]
Wilkinson et al.

[11] 3,839,270
[45] Oct. 1, 1974

[54] CONCRETE REINFORCING MATERIALS

[75] Inventors: Raymond Westrop Wilkinson, Castlecrag, New South Wales; John Newton, Belrose, New South Wales; David Malcolm Stitt, Kingsford, New South Wales, all of Australia

[73] Assignee: A.C.I. Technical Centre Pty. Limited, New South Wales, Australia

[22] Filed: Oct. 25, 1973

[21] Appl. No.: 409,452

Related U.S. Application Data

[62] Division of Ser. No. 264,875, June 21, 1972, abandoned.

[30] Foreign Application Priority Data
Sept. 29, 1971  Australia.............................. 5348/71

[52] U.S. Cl............................ 260/41 AG, 260/37 R
[51] Int. Cl. .............................................. C08f 45/10
[58] Field of Search......................................... 106/99

*Primary Examiner*—Lewis T. Jacobs
*Attorney, Agent, or Firm*—Cushman, Darby & Cushman

[57] ABSTRACT

The invention provides glass fibres coated with or embedded in a cured furane resin as a new article of commerce useful as a reinforcing agent in cement and concrete.

6 Claims, 2 Drawing Figures

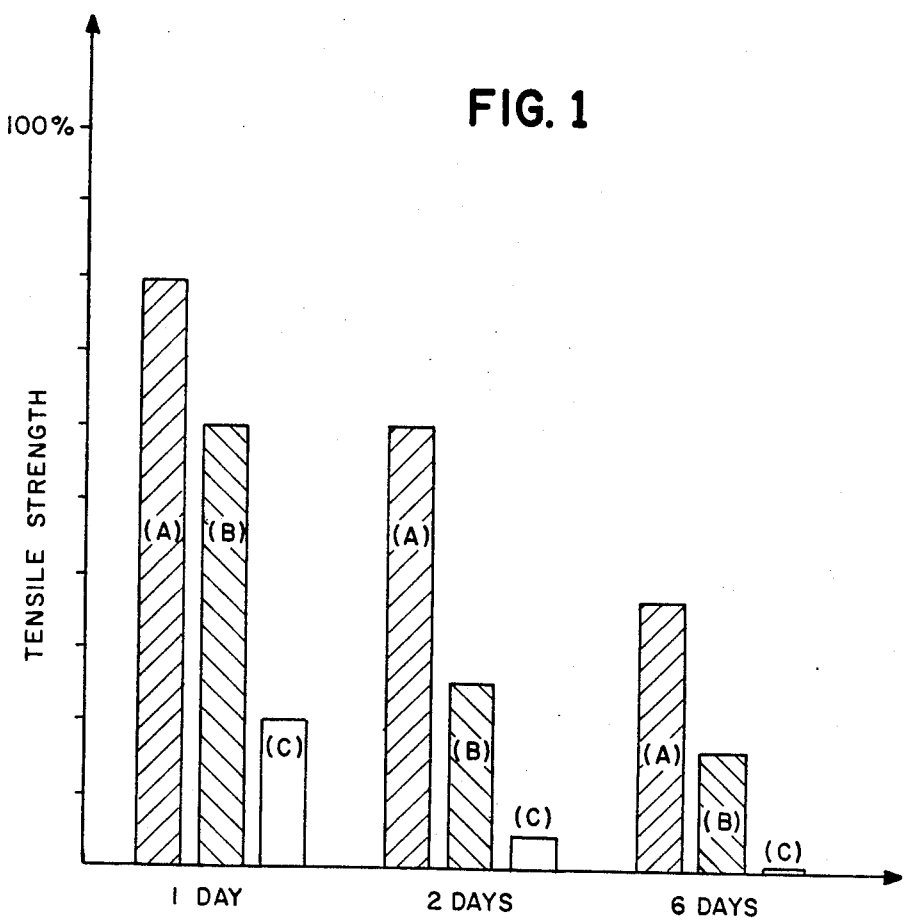

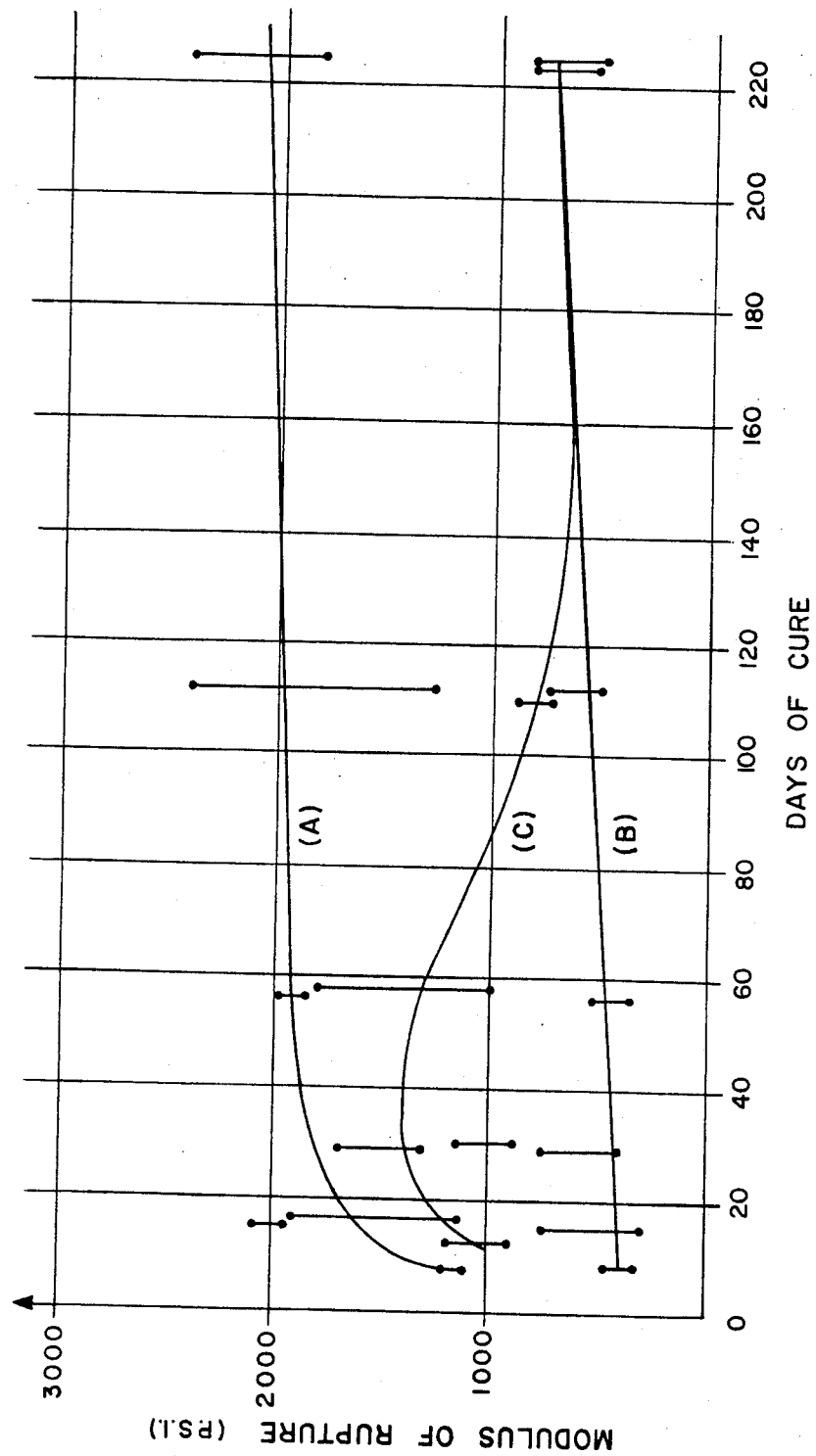

CONCRETE REINFORCING MATERIALS

This is a division, of application Ser. No. 264,875 filed June 21, 1972 and now abandoned.

This invention relates to coatings for glass fibre materials suitable for reinforcing cement and concrete.

It is known that the tensile strength of cement and concrete may be considerably improved by the incorporation of the precursors thereof of an appropriate amount of glass fibre material. However, the normal glass fibre used ("E glass") is very prone to corrosion by the high alkalinity generated during the hydration and setting reactions of Portland cement, the most common cement used in concrete manufacture, and the effect of such reinforcement is often short lived.

This corrosion problem is normally overcome by adopting one or more of four basic techniques. These are:

1. The use of a high alumina or similar cement which does not produce high alkaline conditions during the setting process.
2. The addition of Portland cement of an agent to reduce the alkalinity generated during setting to an acceptable level.
3. The reformulation of the glass used to produce an alkali-resistant glass fibre.
4. The coating of the glass fibres with an impervious and alkali-resistant substance which bonds strongly to both the glass and the cement phases.

This invention is concerned with the last of these techniques.

It is well known in the art that furane resins do not readily adhere to glass. Hence the poor adhesion characteristics of the furane resins have normally precluded their consideration when protection of glass by resistant coatings has been required. However, the applicants have unexpectedly found that furane resin when applied to a glass fibre or roving does give a satisfactory protective coating. In the case of a glass fibre roving the furane also impregnates the fibre bundle giving an enhanced adherence between fibre and resin.

Another disadvantageous feature of furane resins which made their use as coatings appear umpromising, was the brittleness of the cured resins. This feature does not affect the performance of furane protected glass fibres in concrete, as the fibres are in almost a zero flexure situation where delamination of the resin is at a minimum.

Accordingly the present invention provides a method of increasing the alkali-resistance of a glass fibre material suitable for use in reinforcing concrete which comprises coating the said glass fibre material with a furane resin and subsequently curing the coating.

In order to minimise cracking of the resin when it is used to protect reinforcing glass fibre in concrete, it is preferable that the resin should have an extension to failure equal to or greater than either the glass fibre or cement.

As an example, a suitable furane resin may be prepared by reacting furfuryl alcohol with furfuraldehyde in the presence of a catalytic amount of phosphoric acid.

The resin should be of low viscosity to facilitate the coating and impregnation operation, and a satisfactory resin can be obtained by carrying out the condensation reaction at a temperature of 10° to 15° C for 24 hours.

The material so produced may be kept at ambient temperature prior to use.

Epoxy modified furane resins have also been found to be suitable.

Furane coated and impregnated glass fibre rovings may be cured under conditions which may readily be determined by experiment. Thus, for example, satisfactorily cured impregnated rovings were obtained by heating at 110° C for 2 hours or at 80° C for 18 hours. The cured resin was a hard dark-brown to black material, highly resistant to alkali attack and strongly adherent to the glass fibres of the rovings.

These glass fibres, a standard commercial product, had received the normal treatment with methacrylatochromic chloride or P.V.A. to promote bonding to synthetic thermosetting resins.

In accordance with one embodiment of the invention, "E" glass fibre filaments in the form of rovings are continuously drawn from a coil, maintained in close grouping and passed through a resin bath.

The low viscosity resin completely impregnates the glass fibre rovings, and this impregnation action is greatly assisted by capillary flow between the filaments, and the surface tension effects of the liquid film around the fibres.

The exit of the bath is provided with a die of a diameter such that any excess resin is removed from the glass fibre rovings as they emerge from the bath. Some surplus resin builds up behind the die orifice and thus provides a source for impregnating any sections of the glass fibre rovings that may not have been fully impregnated and coated during passage through the bulk resin. The resin is cured by passage through a heated zone and the coated and impregnated rovings are then wound on to a drum prior to cutting to required length.

Furane resins of the classes described as "unmodified furfuryl alcohol polymers" and "aldehyde-modified furfuryl alcohol polymers" are examples of suitable resins, particularly those consisting predominantly of chains of furane nuclei linked by methylene bridges. Such condensation polymers may be produced by alkaline or acidic catalysts. We prefer acid-catalysed resin since handling and storage of the partly prepolymerised resin is more convenient.

In particular the acid catalysed condensation products of furfuryl alcohol with (a) furfuryl alcohol (b) furfuraldehyde and (c) formaldehyde are preferred. For simultaneous layup of cement and glass, the impregnated rovings are used in short chopped lengths, preferably 1 inch to 1½ inches long. For sheet-cement products below 1 inch in thickness rovings having up to 60 "ends" (12,000 filaments) are preferred. The heat-curing conditions vary with number of ends as indicated in the Examples. The reinforcement may also be laid up as rods, which may be up to 1 inch in diameter.

Applicants have found that some of the resin coated reinforcements as described can be used in cement products that undergo autoclaving, i.e. high pressure steam curing at 165° C, emphasising the durability and effectiveness of those coatings even under such extremely aggressive conditions of alkalinity and temperature.

Furane resin coated fibre glass reinforcements are especially suitable for lightweight (i.e., containing a low density aggregate) and aerated (foamed) concrete products in that the density of such reinforcements is comparable to that of the cement matrix and considerably less than that of steel reinforcements, thus gaining an advantage in weight over a conventionally reinforced product. In addition, these furane-resin coated glass rovings may be advantageously used in some situations where the use of steel reinforcement is precluded, e.g. in thin shetts (where the minimum protective covering for steel or 1½ inches of cement cannot be maintained) and in reinforced aerated concrete (where the foamed structure leads to rapid corrosion of steel).

The performance of these furane-resin coated rovings is illustrated in the accompanying drawings, wherein:

FIG. 1 shows the improved resistance of a 204 filament "E" glass strand (A), coated with furane resin, as a function of immersion time in an alkaline test bath held at 75° C compared with a polyurethane coated strand (B) and an uncoated strand (C). This simulated cement environment increases the rate of alkaline attack by at least 50 times.

FIG. 2 shows the increase in strength of cement products reinforced with the impregnated rovings, and the retention of that strength with time. Samples were Portland cement containing 2 percent by weight of impregnated aligned rovings (i.e., 1 percent by weight of glass fibre).

The following Table (1) shows the resistance of the coating to cement environment when autoclaved in 120 p.s.i. steam for 7 hours, thus yielding a fully-reacted cement product which cannot produce further degradation of the reinforcement by alkali attack.

The basic cementitions matrix was 30 percent Portland cement, 50 percent silica sand and 20 percent fine siliceous material.

TABLE 1

| Weight per cent of furane-rovings in the cement | Ultimate modulus of rupture (p.s.i.) |
| --- | --- |
| 0 | 1100 |
| 1.2 | 1500 |
| 1.9 | 1950 |
| 2.3 | 2700 |
| 3.6 | 3150 |
| 4.0 | 3500 |
| 5.0 | 3600 |
| 7.0 | 3750 |

Preferred embodiments of the invention are illustrated in the following Examples.

EXAMPLE 1

The furane resin is prepared by reacting 50 parts by volume of furfural with 2 parts of 85 percent phosphoric acid in a cooled vessel at 10°–15° C. After 15 minutes, 100 parts of furfuryl alcohol is added. The mixture is allowed to react for 25 hours and is then ready for use. A 10-end E-glass fibre roving is drawn through the resin bath, then through a constriction orifice to remove any excess polymer and into a long curing oven. Hot air is passed down this oven countercurrent to the resin-coated roving, entering at 140° C and exiting at 80° C. The roving leaves the oven continuously in either a fully-cured or surface-cured condition, depending upon the residence time of the roving in the oven. Residence times of approximately 4 minutes yield a surface-cured product, and a time of 15 minutes yields a fully-cured product.

Fully-cured roving can be wound directly onto a drum or taken through a chopper to produce a desired length chopped roving. Surface-cured rovings are chopped directly and the short lengths fed into a tumble-heater to complete the curing process. This latter technique has the advantage of allowing some resin to flow from the inside of the chopped roving onto the exposed ends to produce a more fully-covered roving, and inhibit penetration of corrosive fluids into the coated fibre bundle.

EXAMPLE 2

To 100 parts by volume of furfuryl alcohol contained in a chilled reaction flask (0° C) is slowly added 5 parts of a 1:1 mixture of 85 percent phosphoric acid and water, the whole being stirred.

The mixture is allowed to react at ambient temperature until of dark red-brown colour, when it is ready for use. A 60-end roving is drawn through a coating apparatus by means of guides and rollers, then through a constriction to remove excess resin. The coated roving is wound onto a rectangular frame of rods, which when filled is placed in an oven at 110°–120° C for 8 hours, resulting in a fully-cured product. The cured roving is unwound from the frame and may be cut into the desired size of chopped roving.

EXAMPLE 3

An epoxy-modified furane resin is prepared by mixing 70 parts of the furfural-furfuryl alcohol resin in Example 1 with 30 parts of an epoxy resin, such as that manufactured by Shell Chemicals P/L and supplied under the name Epikote 828, which may be thinned with 5 parts of acetone prior to addition to the furane resin. A 60-end roving, having been drawn through a coated and constriction, is continually wound around two spaced parallel rods until a bundle containing the required number of loops is obtained. One of the winding rods is then rotated twisting the loops into a single length of twisted rovings. The rod is refixed and tension applied to the twisted rovings. After excess rein has drained off, the rovings and rods are placed in an oven at 100°–120° C for 8 hours, thus producing a reinforcing rod with spatulate ends and diameter dependent on the number of rovings originally wound onto the frame. The spatulate ends are of advantage in providing a mechanical bond in the concrete or cement structure which augments the frictional bond to the rod surface, and allows maximum stress-transfer from the concrete to reinforcement.

This epoxy-modified furane resin showed improved flexibility over the resin of Example 1.

EXAMPLE 4

A bundle of uncoated looped rovings as described in Example 3 is secured at one end and drawn into a cylindrical mould. One end of the mould is connected to the furane resin bath and vacuum applied at the other causing the resin to flow into the mould. When completely filled, the vacuum is removed and the mould sealed. The mould containing the resin and the glass fibre is then placed in an oven to cure at 100°–120° C for 12 hours after which the finished rods are removable from the mould. This method is suitable for making reinforcing rods.

EXAMPLE 5

Suitable cut lengths of uncoated rovings are poured into a mould with a channel shape 1 inch × 1 inches. Furane resin is poured into the mould until full and excess resin removed. The mould is then placed into an oven at 100°–120° C for 12 hours to cure the resin. Fibreglass-resin composite rods or plates of square or rectangular cross-section can be obtained in this way, suitable for laying in concrete as reinforcement.

EXAMPLE 6

Furane resin-impregnated rovings from a suitable number of coaters are passed together through a die to produce a single tow, which is fed into a curing oven as described in Example 1. The speed of the tow through the oven is much slower than for the single roving because of the thickness of these products typically 50 ft/hr. The cured rod which emerges from the oven is passed between tensioning rollers and then is cut into length.

EXAMPLE 7

Fibreglass mesh, woven from 60-end rovings and of 1/2 inch pitch, is dip coated in a trough containing the furane resin. After impregnation and when the excess resin has drained off, the mesh is taken through an oven at 100°–120° C over 4 hours. This square-mesh is particularly suited to reinforcing slabs or sheet of cement products.

EXAMPLE 8

A 60-end roving is drawn through a furane-resin bath and die and wound around a metal frame in such a manner as to produce a mesh of impregnated glass fibres. When fully wound, the frame and mesh are placed in a curing oven at 100°–120° C for 4 hours.

The resin-coated rods or mesh described in the Examples may be incorporated into cement mortars in any of the ways commonly used for the reinforcement of mortars by steel rods, wire, or mesh. An outstanding advantage of the short chopped strands over similar strands of uncoated alkali-resistant glass is their rigidity, allowing placement of the reinforcement by random scattering, followed by pouring of cement mortar. This process of easy infiltration of a random matrix of reinforcing strands is not possible with non-rigid fibres, such flexible chopped fibres acting as a filtermat and preventing incorporation.

We claim:

1. A method of increasing the alkali resistance of a glass fiber material in reinforced concrete, said method comprising the steps of coating glass fibers with a furane resin, curing the furane resin to produce an alkali-resistant cured furane coating on the glass fibers, and incorporating the coated glass fibers in concrete or cement to reinforce same, whereby the reinforced concrete or cement reinforcing glass fibers exhibit increased resistance to alkali attack.

2. A method according to claim 1, wherein the furane resin is an unmodified furfuryl alcohol polymer or an aldehyde-modified furfuryl alcohol polymer.

3. A method according to claim 1, wherein the furane resin is the acid catalyzed condensation product of furfuryl alcohol with furfuryl alcohol, furfuraldehyde or formaldehyde.

4. A method according to claim 3, wherein the furane resin has been prepared by reacting furfuryl alcohol with furfuraldehyde in the presence of a catalytic amount of phosphoric acid.

5. A method according to claim 4, wherein the condensation reaction is carried out at a temperature of 10° to 15° C for a period of about 24 hours.

6. A method according to claim 1, wherein the furane coatings are cured by heating.

* * * * *